(12) United States Patent
Dan et al.

(10) Patent No.: US 7,346,068 B1
(45) Date of Patent: Mar. 18, 2008

(54) TRAFFIC MANAGEMENT SCHEME FOR CROSSBAR SWITCH

(75) Inventors: Yie-Fong Dan, Cupertino, CA (US); Sonny Tran, Fremont, CA (US); Rudy Klecka, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 998 days.

(21) Appl. No.: 10/319,237

(22) Filed: Dec. 13, 2002

(51) Int. Cl.
*H04L 12/56* (2006.01)

(52) U.S. Cl. .................................. 370/413; 370/428
(58) Field of Classification Search ............... None
See application file for complete search history.

(56) References Cited

U.S. PATENT DOCUMENTS

| | | | |
|---|---|---|---|
| 5,500,858 A | 3/1996 | McKeown | 370/60 |
| 5,748,629 A * | 5/1998 | Caldara et al. | 370/389 |
| 6,195,335 B1 | 2/2001 | Calvignac et al. | 370/236 |
| 6,324,165 B1 * | 11/2001 | Fan et al. | 370/232 |
| 6,349,097 B1 | 2/2002 | Smith | 370/390 |
| 6,834,053 B1 * | 12/2004 | Stacey et al. | 370/395.4 |
| 7,027,457 B1 * | 4/2006 | Chiussi et al. | 370/414 |
| 7,142,514 B2 * | 11/2006 | Wang et al. | 370/235 |
| 7,142,564 B1 * | 11/2006 | Parruck et al. | 370/474 |
| 2003/0179754 A1 * | 9/2003 | Shankar et al. | 370/395.4 |

OTHER PUBLICATIONS

R. Cam et al., "System Packet Interface Level 4 (SPI-4) Phase 2: OC-192 System Interface for Physical and Link Layer Devices", Optical Internetworking Forum, Jan. 2001.

* cited by examiner

*Primary Examiner*—Brian Nguyen
(74) *Attorney, Agent, or Firm*—Cindy Kaplan

(57) ABSTRACT

A crossbar switch is provided that can allocate output port bandwidth both among multiple classes of service and among input ports. In one implementation, there are two scheduling stages that may be implemented together. One scheduling stage can select traffic for output based on class of service whereas the other scheduling stage may perform a further selection based on destination output port. This allows greater flexibility in managing congestion and allocating limited available bandwidth.

24 Claims, 4 Drawing Sheets

TRAFFIC MANAGEMENT SCHEME FOR CROSSBAR SWITCH

BACKGROUND OF THE INVENTION

The present invention relates to data networking and more particularly to switch design.

Switches represent an important class of data networking devices. The typical switch has multiple inputs and multiple outputs. In the well-known crossbar configuration, data traffic arriving at any input port may be transferred to any output port. The output ports themselves may be buffered to better match switch output rate to interface bandwidth.

Congestion at the switch output is nonetheless a challenge. Individual interface devices couple to a particular switch output may not be capable of handling the current traffic load arriving at all the switch inputs and destined for that output. A current solution is to divide traffic into multiple priority classes. Where switch output bandwidth is scarce, available capacity is allocated based on priority.

However, there is currently no way of allocating limited switch output port bandwidth among input ports. This capability would be desirable in many applications. For example, a service provider that is using the switch as an edge network device might wish to allocate limited bandwidth among multiple customers that are physically connected to different input ports of the switch fabric.

What is need are systems and methods for allocating switch output port bandwidth both among input ports and among service classes such as priority levels.

SUMMARY OF THE INVENTION

By virtue of one embodiment of the present invention, a crossbar switch is provided that can allocate output port bandwidth both among multiple classes of service and among input ports. In one implementation, there are two scheduling stages that may be implemented together. One scheduling stage can select traffic for output based on class of service whereas the other scheduling stage may perform a further selection based on destination output port. This allows greater flexibility in managing congestion and allocating limited available bandwidth.

A first aspect of the present invention provides a method for operating an N-input M-output switch. The method includes: buffering traffic in a plurality of queues, each of the queues corresponding to a combination of input, output, and class, for each combination of class and output, performing a first selection process by selecting a source queue from among N of the plurality of queues associated with a combination of output and class, and for each output, performing a second selection process by selecting a next data block for output from among the source queues selected in the first selection process.

A second aspect of the present invention provides apparatus for operating an N-input M-output switch. The apparatus includes: a plurality of input ports, a plurality of output ports, a port scheduling system that selects input data for output based on target output port, and a class of service scheduling system that further selects the input data for output based on class of service. The port scheduling system and the class of service scheduling system operate in tandem to allocate available output port bandwidth among the input ports and among classes of service.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative application. A crossbar switch accepts multiple inputs and provides multiple outputs with traffic arriving at any input being able to depart via any output. In the implementation to be described herein, input traffic and output traffic are formatted in accordance with the so-called SPI-4.2 standard promulgated by the Optical Internetworking Forum of Fremont, Calif. More specifically, one particular implementation employs the OIF-SPI4 02.0 standard as specified by "System Packet Interface Level 4 (SPI-4) Phase 2: OC-192 System Interface for Physical and Link Layer Devices," *Optical Internetworking Forum*, January 2001, the contents of which are herein incorporated by reference in their entirety for all purposes.

Figure 1:
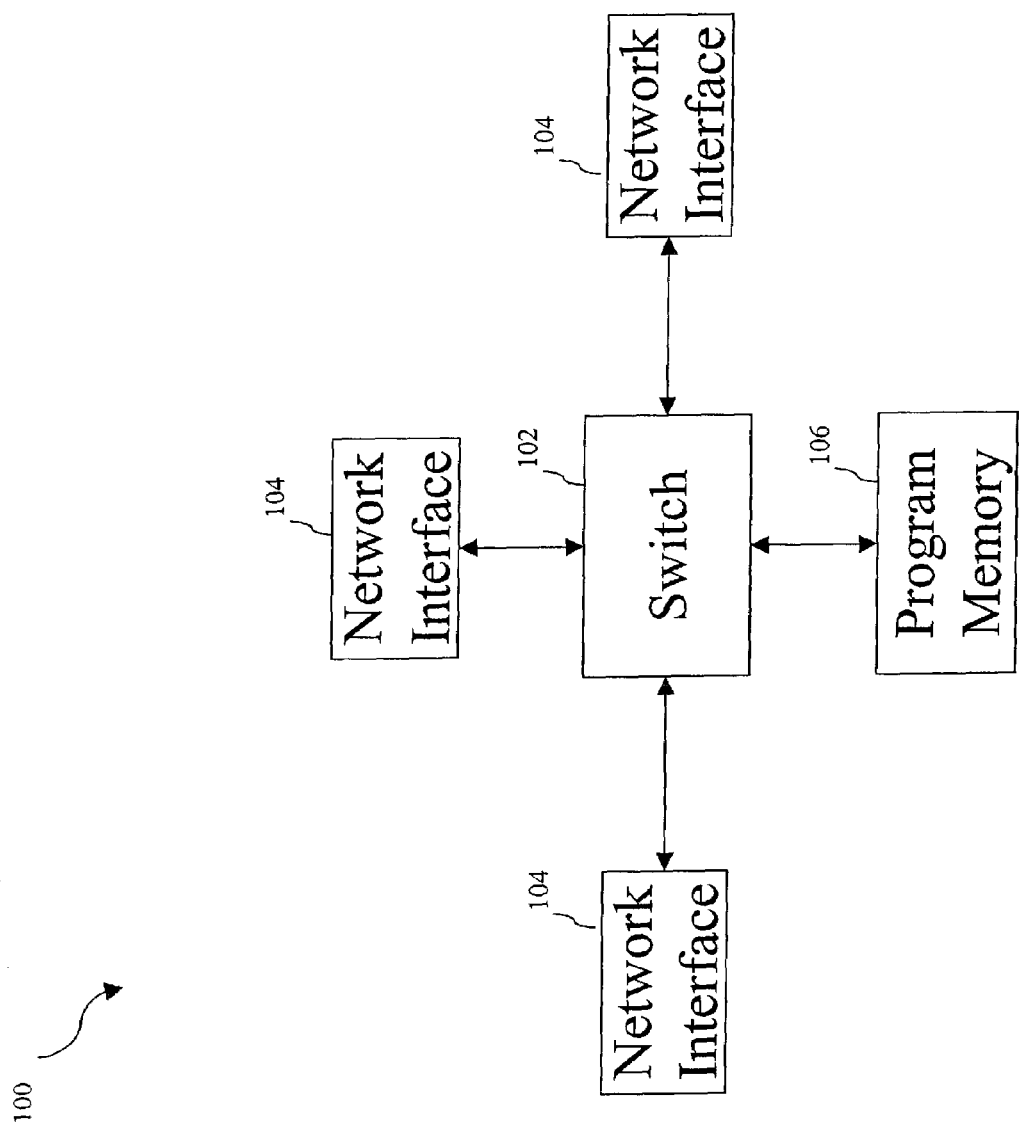
FIG. 1 depicts a network device according to one embodiment of the present invention.

FIG. 1 depicts a network device 100 to which embodiments of the present invention may be applied. Within network device 100 there is a switch 102 bidirectionally coupled to e.g., three network interfaces 104. Switch 102 is capable of communicating data between any pair of network interfaces. The data may be e.g., packets such as IP packets, IP packets encapsulated with MPLS labels, ATM cells, Frame Relay frames, Ethernet frames, etc. Thus, depending on the nature of the data handles, switch 102 may act as an ATM switch, MPLS switch, layer two Ethernet switch, layer three IP switch, frame relay switch, packet over SONET (POS) switch, etc. Network interfaces 104 thus may be e.g., Ethernet interfaces, wireless Ethernet interfaces, SONET interfaces, Frame Relay interfaces, etc. For each input unit of data such as a cell, a decision is made as to the correct output network interface and the unit is sent there.

In a preferred embodiment, switch 102 is implemented as an application specific integrated circuit (ASIC). All switching operations as described herein are implemented as VLSI circuitry. Alternatively, a portion of the functionality of switch 102 may be implemented by an internal processor executing stored instructions or code as would be found on a program memory 106. Program memory 106 may be implemented by any suitable computer-readable storage medium. Furthermore, longer term storage of instructions to be executed by switch 102 may be provided by long term storage media such as hard drives, optical discs, or any appropriate medium. The term "computer-readable storage medium" may also be understood to encompass the transfer of code or instructions across a computer network such as the Internet.

Figure 2:
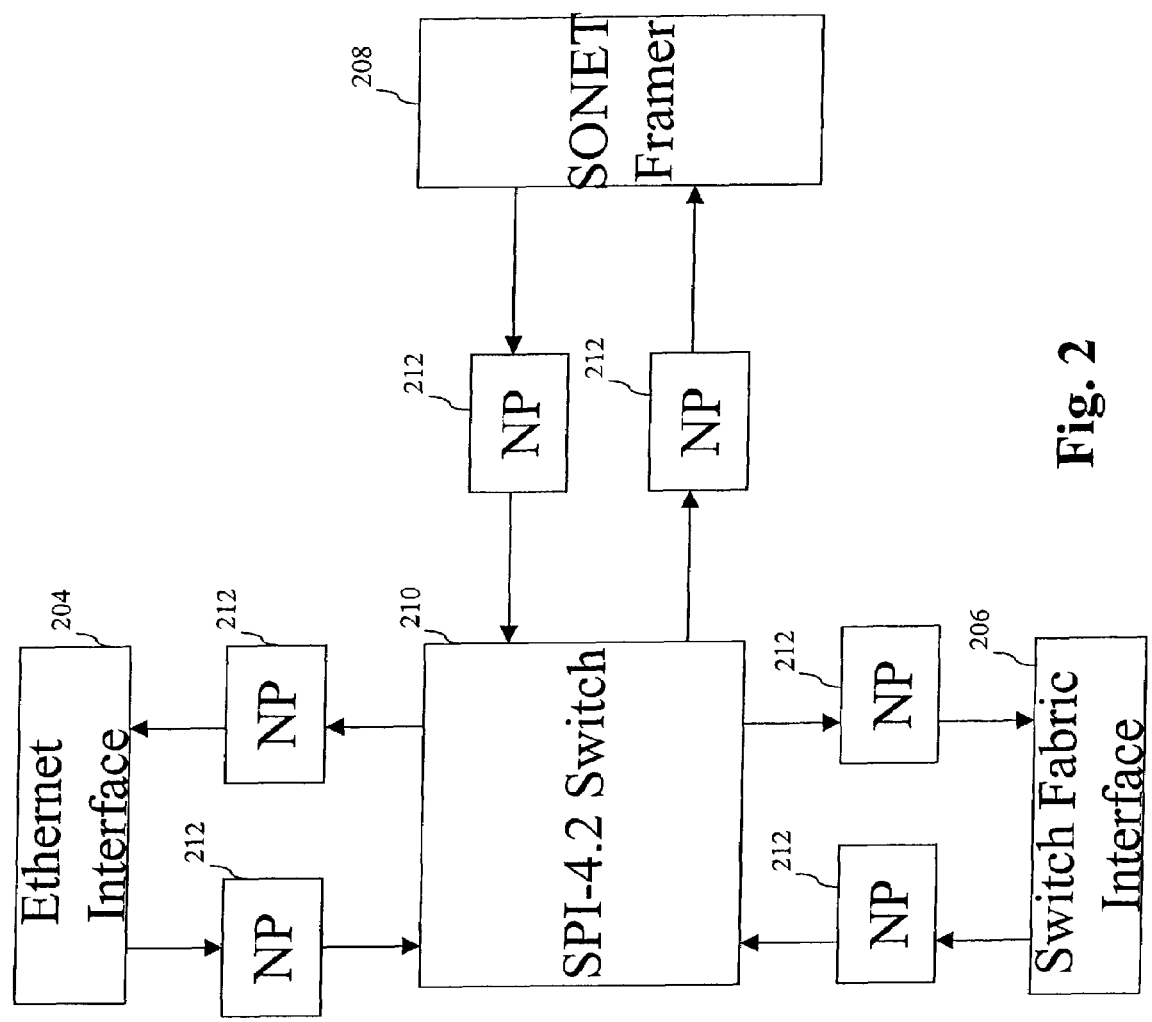
FIG. 2 depicts further details of the network device of FIG. 1.

FIG. 2 depicts further details of a representative implementation of network device 100. The network interfaces are now specifically identified as an Ethernet interface 204, a switch fabric interface 206, and a SONET framer 208. Ethernet interface 204 incorporates all medium access control (MAC) and physical layer functionality necessary to communicate packets across Ethernet networks. Switch fabric interface 206 may operate to interface to a network switch device in accordance with the CSIX protocol promulgated by the Network Processing Forum. SONET framer 208 similarly can send and receive data in accordance with the SONET standard. Switch 210 bidirectionally communicates with the interfaces 204 and 206 and framer 208. Switch 210 has a crossbar switch having three inputs and three outputs in this representative implementation. It will of course be understood that the present invention is applicable to switches with any number of inputs and/or outputs.

Each input and output of switch 210 is coupled to its associated interface via a network processor 212. At the ingress to the switch, network processor 212 performs network operations such as classification, policing to drop excessive traffic, additional queuing, etc. At the egress of switch 210, network processor 212 may perform header manipulation, additional queuing, etc. Network processors 212 and switch 210 interact in accordance with the SPI-4.2 standard as identified above. Data flowing between network processors 212 and switch 210 is thus preferably formatted into 64 byte cells. Network processors 212 may be implemented by the Castine™ network processor available from Intel. In one implementation, the inputs and outputs of switch 210 operate at OC-192 rates, i.e., approximately 10 Gbps.

Figure 3:
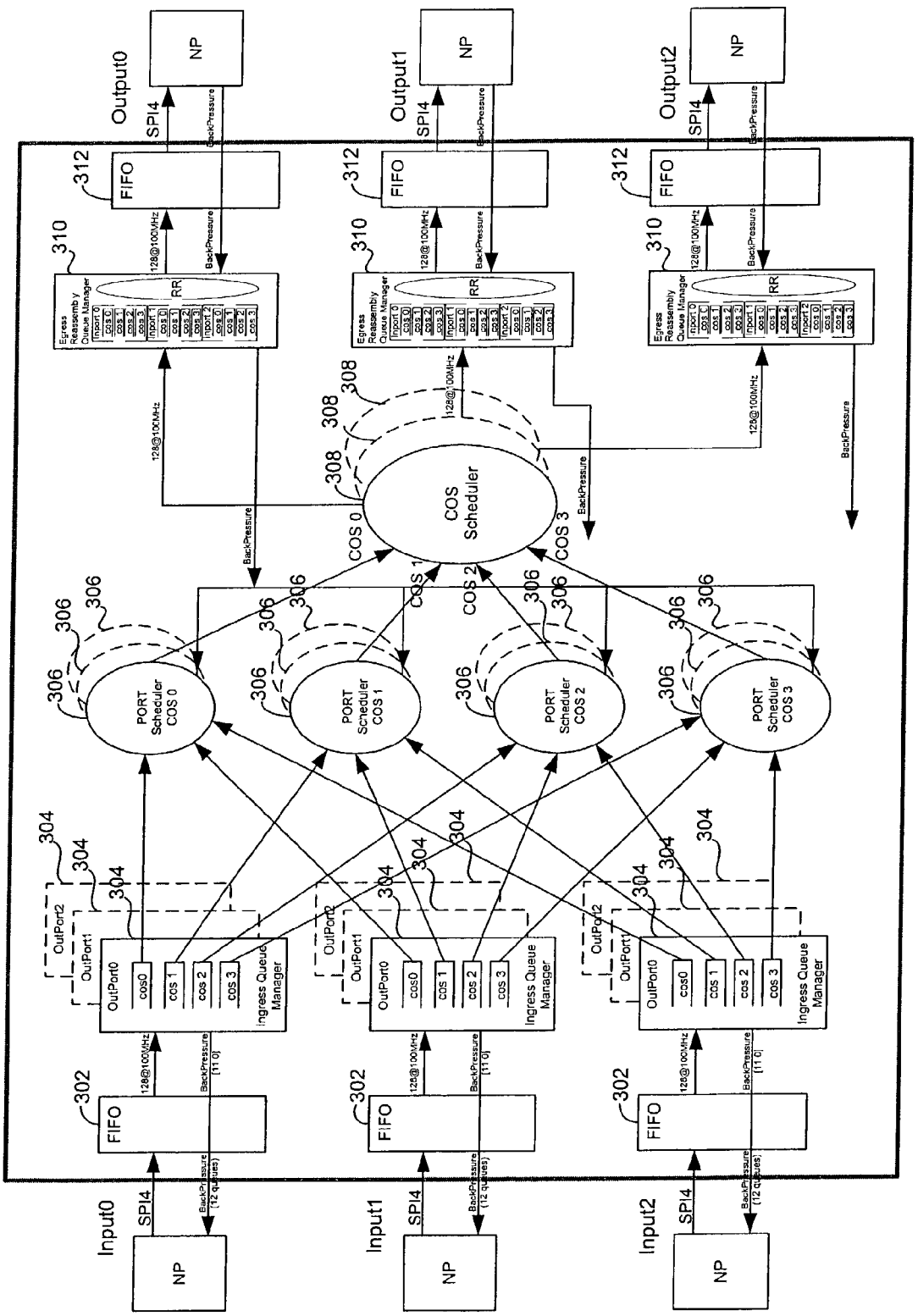
FIG. 3 depicts a crossbar switch structure according to one embodiment of the present invention.

FIG. 3 depicts the internal structure of switch 210 according to one embodiment of the present invention. Three input ports Input0, Input1, and Input2 are depicted at the left side of switch 210. Three output ports are depicted at the right side, Outputs, Output1, and Output2. Each input port is coupled to a first-in first-out (FIFO) memory 302. Each FIFO 302 has its output coupled to a series of three ingress queue managers 304, each one associated with a particular output port. Thus there are a total of nine ingress queue managers. Within each ingress queue manager 304, there are four ingress queues each associated with a particular class of service or "COS." Examples of COS include, e.g., real-time voice, non-real-time video, real-time video, private line traffic, Internet traffic, etc. The four queues are labeled as COS 0, COS 1, COS 2, and COS 3. To simplify FIG. 3, only one ingress queue manager 304 has its contents depicted for each input port.

A series of port schedulers 306 follow ingress queue managers 304. There is one port scheduler 306 for each combination of output port and class of service. The output port of the port scheduler determines its feeding ingress queue managers while the class of service of the port scheduler selects the queue within the ingress queue managers. The port schedulers 306 associated with output port 0 are depicted as ovals with continuous borders while the port schedulers associated with the other output ports are shown in dotted line form for ease of illustration.

The port schedulers 306 are in turn followed by a set of three class of service (COS) schedulers 308, each associated with a single output port. Each of COS schedulers 308 receives input from the four port schedulers 306 associated with the same output port. Again, the COS scheduler 308 is shown as a dark line oval with the other COS schedulers 308 being depicted in dotted line form for ease of depiction.

For each output port, there is an egress reassembly queue manager 310. Within each egress reassembly queue manager 310, there is a series of queues such that there is a queue associated with each combination of input port and class of service. Following each egress reassembly queue manager 310, there is an output FIFO 312. The output FIFOs 312 are coupled to the output ports.

To prevent forwarding of data through switch 210 when unresolvable congestion exists, a series of backpressure signals are provided. There is a backpressure signal from each output port 312 back to the associated egress reassembly queue manager 310 to signal a need to halt traffic through that output port. Then each egress reassembly queue manager 310 forwards a backpressure signal to all of its associated port schedulers 306 whenever one of its output queues is full. Backpressure signals are also sent for each queue within the ingress queue managers 304 back to the network processor connected to the input port.

Figure 4:
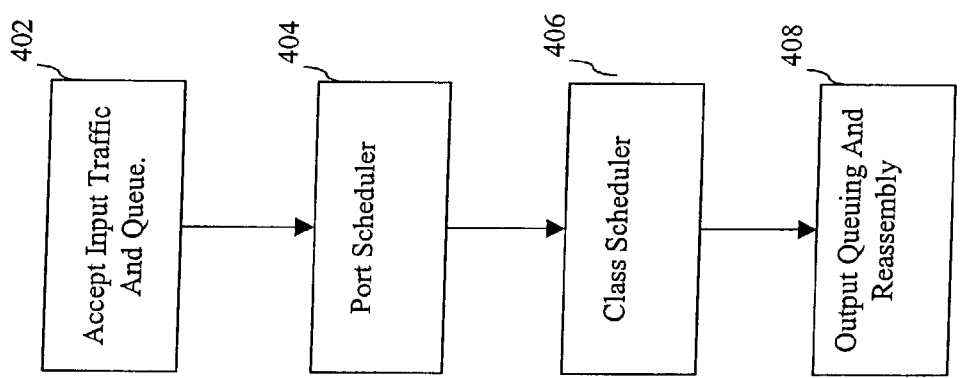
FIG. 4 is a flow chart describing steps of operation of a crossbar switch according to one embodiment of the present invention.

Operation of switch 210 will be described with reference to the flow chart of FIG. 4. Port schedulers 306 and COS schedulers 308 operate in tandem to prioritize traffic for output.

At step 402, switch 210 accepts input traffic from the various input ports. Input data is in the SPI-4.2 format as identified above and is buffered in FIFOs 302 before being placed in the appropriate queue based on destination output port and class of service. The classification information may come from the originating network processor, or alternatively, from a classification system (not shown) built into the switch. After FIFO 302, all queuing and scheduling operations are performed on data blocks that are e.g., 64 or 128 bits wide, rather than complete cells. The clock rate for these operations is, e.g., 200 MHz for 64 bit wide data blocks or 100 MHz for 128 bit wide blocks. After FIFO 302, the data now organized into 64 or 128 bit wide blocks, is placed into the appropriate queue within ingress queue managers 304 based on the class of service and destination output port.

Step 404 refers to the operation of port schedulers 306. In one implementation, port schedulers 306 employ the well-known weighted fair queuing algorithm for selecting the next data block. Each port scheduler 306 selects from among the three input ports during each clock period. Each port scheduler 306 receives a backpressure signal from the egress reassembly queue manager 310 of the associated output port. Also, each port scheduler 306 maintains a weighted fair queuing counter value for each input port. By varying the initially loaded counter value, one can allocate available bandwidth among the input ports.

During each clock period, each port scheduler 306 accepts three input requests, considers the corresponding three weighted fair queuing counter values, one backpressure signal from the output, and generates one grant where each grant transfers one 64 or 128 bit data block out of the queues of ingress queue managers 304. Each port scheduler 306 first qualifies its ingress queue inputs. If at least one queue is active (non empty) and if the backpressure signal for that output port is inactive, and if the weighted fair queuing counter is non-zero indicating available credit, then the request is considered a qualified request. Only qualified requests can enter the arbitration contest among inputs to the port scheduler 306.

A grant is issued to each qualified ingress queue in a round-robin fashion until all counters reach zero. Each time a grant is issued, the counter value associated with that input port is decremented by one. The counters are reloaded when all of their values hit 0, the back pressure signal is inactive, and there are no more qualified requests from the other queues feeding that port scheduler.

Further allocation of output port bandwidth results from the operation of COS schedulers 308 at step 406. COS schedulers 308 allocate output port bandwidth among the multiple classes of service. COS schedulers 308 may also employ the weighted fair queuing algorithm. A weighted fair queuing counter is therefore maintained for each class of service with the initial counter value for each class of service depending on the desired bandwidth allocation among classes. It will be understood that steps 404 and 406 may essentially be performed together to generate the appropriate selections.

Arbitration among the four inputs from the port schedulers operates as follows. If the port scheduler for that class of service has selected data for output and if there is a positive counter value for that class of service, then that input is qualified. Arbitration then occurs among the qualified port schedulers. The class of service with the highest current counter value is selected at each clock cycle. The 64 bit or 128 bit data block that had been selected for that clock cycle by the port scheduler winning the arbitration between service classes is then forwarded to the appropriate one of the egress reassembly queue managers 310. The counter value associated with that class of service is then decremented by 1. The counters are reloaded with their initialization values when at least one of the four counter values reaches 0 and there are no more qualified requests available from the other classes of service. By varying initialization values among the service classes, one can allocate bandwidth.

In an alternative embodiment, the COS 0 queues operate as priority queues. Data in the COS 0 queue then has priority. Whenever the port scheduler associated with COS 0 has data to transmit, it wins the arbitration contest. If there is no COS 0 data during a given clock cycle, weighted fair queuing is used to arbitrate among the three remaining classes of service. In this mode, the counter associated with COS 0 is ignored.

Step 408 refers to the operation of egress reassembly queue managers 310. Data arriving within each egress reassembly queue manager 310 is sent to a queue particular to the origin input port and class of service. Within these queues, the 64 bit or 128 bit wide data blocks are reassembled into SPI 4.2 cells. These are then selected for output in a round robin fashion. Output is forwarded via FIFOs 312 every clock period as long as there is no backpressure from the associated network processor.

It will be seen then that a switch architecture has been presented that can allocate available bandwidth among both classes and input ports. One can allocate bandwidth among input ports independently for each combination of class of service and output port by modification of queuing counter initialization values in the appropriate port schedulers. One can also allocate bandwidth among classes of service independently for each output port by modification of queuing counter initialization values in the appropriate OCS scheduler. The architecture is compatible with the SPI-4.2 standard and thus allows data rates as high as e.g., 10 Gbps on each input port and output port.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, details such as the number of input ports and output ports, traffic types, data rate, data block width, queuing algorithm, etc. may be varied freely consistent with the present invention.

The invention claimed is:

1. A method for operating an N-input M-output switch, said method comprising:

receiving traffic in SPI-4.2 cells;

buffering said traffic in a plurality of queues, each of said queues corresponding to a combination of input, output, and class;

for each combination of class and output, performing a first selection process by selecting a source queue from among said plurality of queues associated with a combination of output and class;

for each output, performing a second selection process by selecting a next data block for output from among said source queues selected in said first selection process, said first and second selection performed on data blocks;

for at least one output, assembling data into SPI-4.2 cells;

outputting said assembled SPI-4.2 cells; and adjusting queuing counter values to allocate bandwidth among input ports for each combination of said class and said output for said first selection process, and allocate bandwidth among said classes for said second selection process;

said first selection process comprising accepting input requests, issuing a grant to one of said plurality of queues based on said queuing counter values and a backpressure signal, and decrementing said queuing counter value associated with said queue, wherein said grant transfers one data block out of said queue.

2. The method of claim 1 wherein the class corresponds to a priority level.

3. The method of claim 1 wherein said first selection process comprises employing a weighted fair queuing algorithm.

4. The method of claim 1 wherein said second selection process comprises employing a weighted fair queuing algorithm.

5. The method of claim 1 wherein said data blocks are 64 or 128 bits wide.

6. The method of claim 1 wherein performing said first and second selection processes comprises employing a weighted fair queuing algorithm.

7. The method of claim 1 wherein performing a first selection process comprises selecting a source queue from among a plurality of input ports during each clock period.

8. The method of claim 1 further comprising adjusting at least one counter value associated with one of N input ports to allocate available bandwidth among the N input ports.

9. The method of claim 1 further comprising, during a clock period:

accepting one or more input requests; and selecting and transferring one data block out of said plurality of queues based on N weighted fair queuing counter values corresponding to the N input requests, wherein N is equal to the number of said input requests.

10. The method of claim 1 further comprising adjusting a counter value for at least one of the classes to allocate bandwidth among the classes.

11. The method of claim 1 further comprising reloading said queuing counter values when said values reach zero, a back pressure signal is inactive, and no qualified requests are pending from queues feeding a scheduler for said first selection process.

12. Apparatus for operating an N-input M-output switch, said apparatus comprising:

a plurality of input ports configured to receive SPI-4.2 cells;

a plurality of output ports configured to transmit SPI4.2 cells;

a port scheduling system that selects input data for output based on target output port; and a class of service scheduling system that further selects said input data for output based on class of service; and an assembler system that assembles data into SPI-4.2 cells prior to output via said plurality of output ports;

wherein said port scheduling system and said class of service scheduling system operate in tandem to allocate available output port bandwidth among said input ports and among classes of service and said port scheduling system; and wherein said port scheduling system is configured to accept input requests, issue a grant to a queue based on queuing counter values and a backpressure signal, and decrement said queuing counter value associated with said queue, wherein said grant transfers one data block out of said queue.

13. The apparatus of claim 12 wherein at least one of said port scheduling system and said class of service scheduling system employ a weighted fair queuing algorithm.

14. The apparatus of claim 12 wherein at least one of the classes of service corresponds to a priority level.

15. The apparatus of claim 12 further comprising a plurality of FIFO memories associated with each of said plurality of input ports.

16. The apparatus of claim 12 further comprising a plurality of input queues, each associated with a combination of input port, output port, and class of service.

17. Apparatus for operating an N-input M-output switch, said apparatus comprising:

means for receiving traffic in SPI-4.2 cells means for buffering said traffic in a plurality of queues, each of said queues corresponding to a combination of input, output, and class;

means for, for each combination of class and output, performing a first selection process by selecting a source queue from among said plurality of queues associated with a combination of output and class;

means for, for each output, performing a second selection process by selecting a next data block for output from among said source queues selected in said first selection process, said first and second selection processes performed on data blocks; and for at least one output, means for assembling data into SPI-4.2 cells;

means for outputting said assembled SPI-4.2 cells; and means for adjusting queuing counter values to allocate bandwidth among input ports for each combination of said class and said output for said first selection process, and allocate bandwidth among said classes for said second selection process;

said means for performing said first selection process comprising means for accepting input requests, issuing a grant to one of said plurality of queues based on said queuing counter values and a backpressure signal, and decrementing said queuing counter value associated with said queue, wherein said grant transfers one data block out of said queue.

18. The apparatus of claim 17 wherein the class corresponds to a priority level.

19. The apparatus of claim 17 wherein said first selection process comprises employing a weighted fair queuing algorithm.

20. The apparatus of claim 17 wherein said second selection process comprises employing a weighted fair queuing algorithm.

21. A computer program product comprising a computer-readable storage medium having stored thereon computer-executable program codes executable by a processor to operate an N-input M-output switch, said computer program product comprising:

code that receives traffic in SPI-4.2 cells;

code that buffers the traffic in a plurality of queues, each of said queues corresponding to a combination of input, output, and class;

code that, for each combination of class and output, performs a first selection process by selecting a source queue from among said plurality of queues associated with a combination of output and class;

code that, for each output, performs a second selection process by selecting a next data block for output from among said source queues selected in said first selection process, said first and second selection processes performed on data blocks;

for at least one output, code that assembles data into SPI-4.2 cells; and code that outputs said assembled SPI-4.2 cells;

code that adjusts queuing counter values to allocate bandwidth among input ports for each combination of said class and said output for said first selection process, and allocate bandwidth among said classes for said second selection process;

said code that performs said first selection process comprising code that accepts input requests, issues a grant to one of said plurality of queues based on said queuing counter values and a backpressure signal, and decrements said queuing counter value associated with said queue, wherein said grant transfers one data block out of said queue; and the computer-readable storage medium that stores the codes.

22. The computer program product of claim 21 wherein the class corresponds to a priority level.

23. The computer program product of claim 21 wherein said first selection process comprises employing a weighted fair queuing algorithm.

24. The computer program product of claim 21 wherein said second selection process comprises employing a weighted fair queuing algorithm.

* * * * *